![United States Patent Office logo]

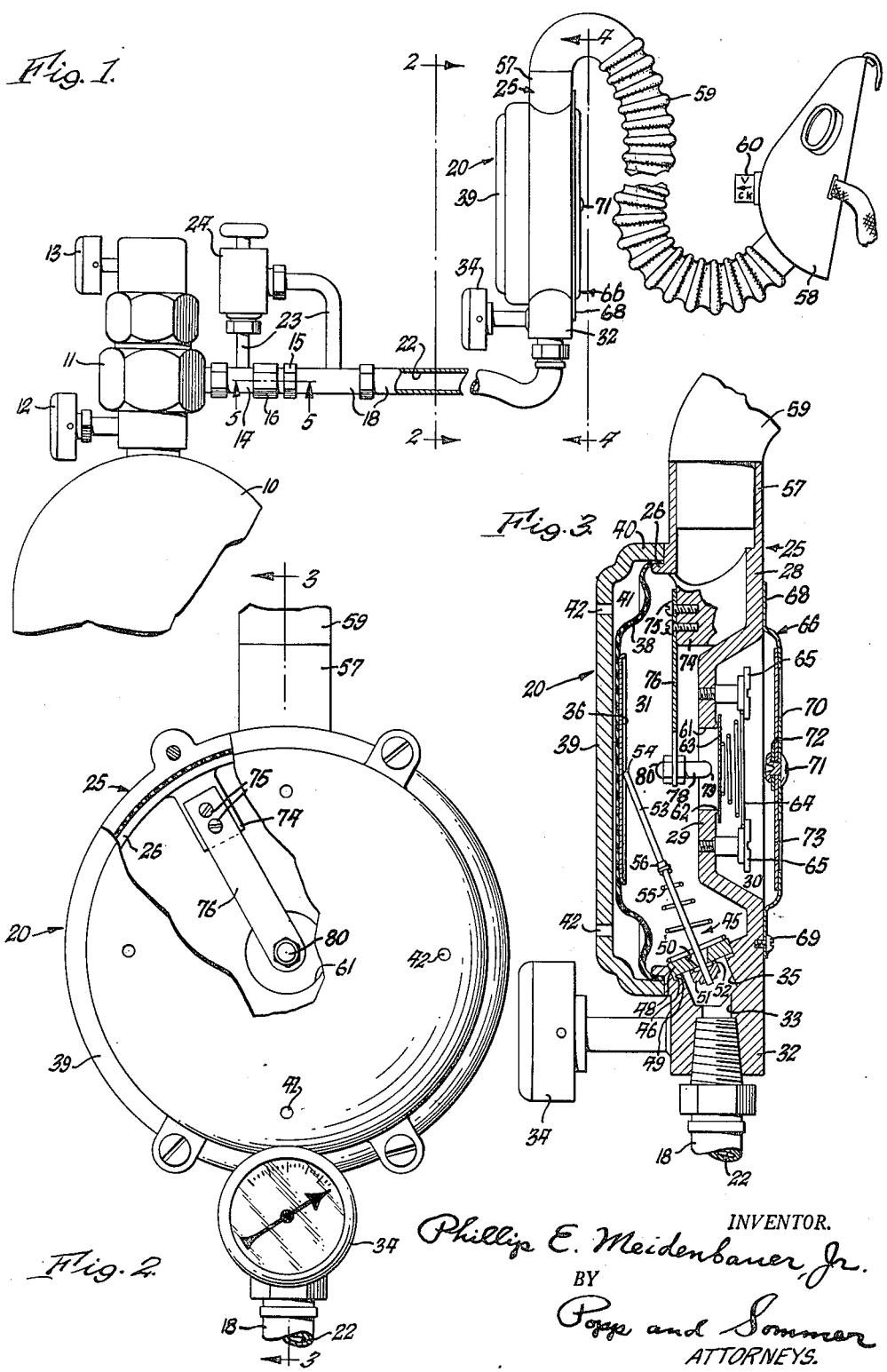

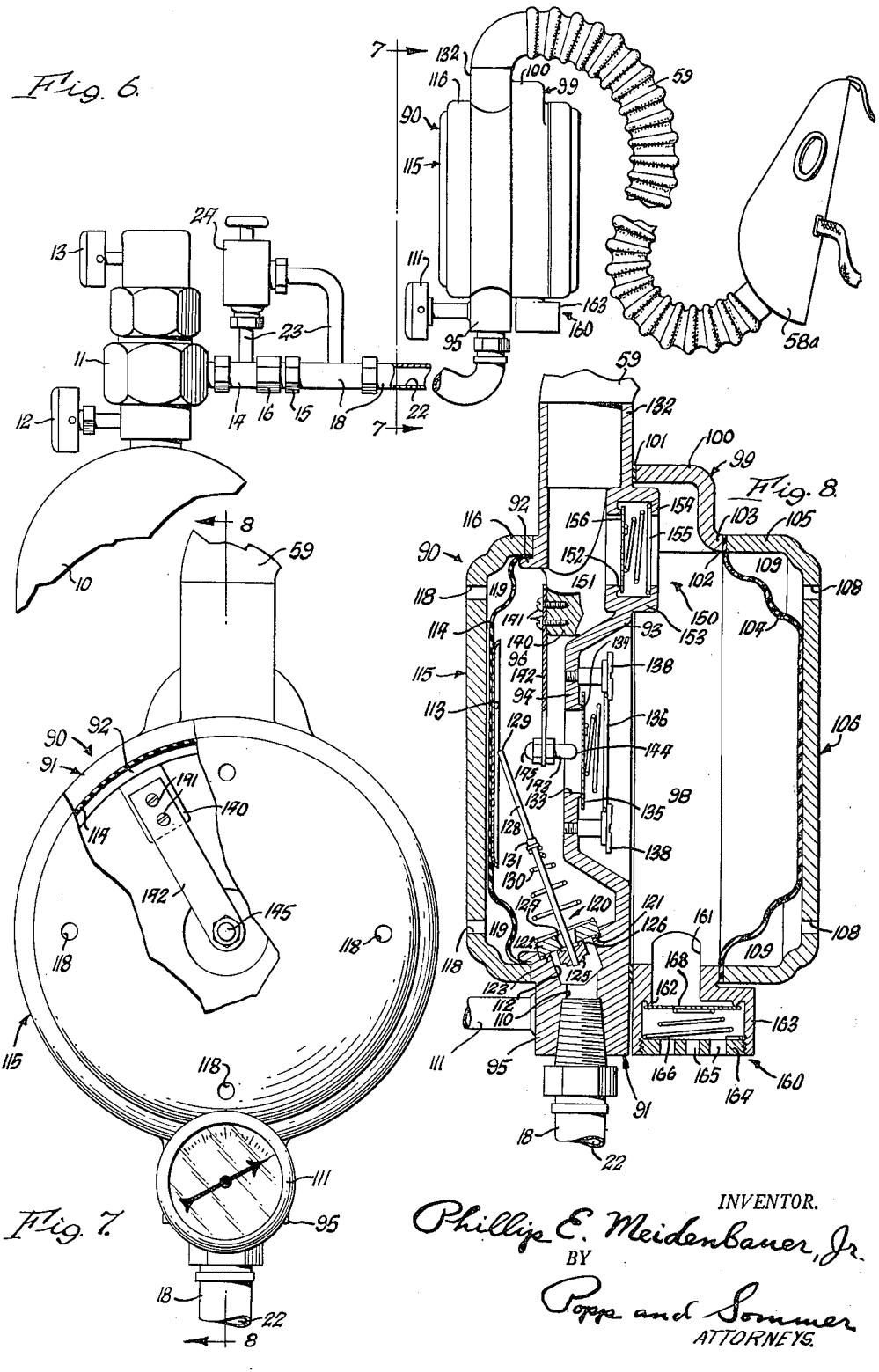

2,766,752
Patented Oct. 16, 1956

2,766,752

APPARATUS FOR SUPPLYING GAS FOR RESPIRATION

Phillip E. Meidenbauer, Jr., Lancaster, N. Y., assignor to Firewel Industries, Buffalo, N. Y., a copartnership Application November 28, 1952, Serial No. 322,842

12 Claims. (Cl. 128—142)

This invention relates to a method and apparatus for supplying gas for respiration and more particularly to such mechanism for supplying, in response to the respiratory demand of the user, separate charges of relatively effective and relatively ineffective gases, examples of such contrasting gases being oxygen contrasted with air and oxygen or air contrasted with the products of exhalation of the user.

In breathing, there are several distinct bodies of gas in each normal respirator cycle. The first of these is a body of residual or static gas which remains constantly in the lungs although, of course, going through a slow interchange with the second body of gas which enters and leaves the lungs with each respiratory cycle. The third body of gas is supplementary tidal gas which on each respiratory cycle enters the mouth, throat or nose, and passes to the lungs, hereinafter referred to as respiratory passages as distinguished from the lungs, but does not actually enter the lungs. This last body, to which must be added the tidal gas which enters a mask but not the body of the user, is uselessly employed so far as the body's respiratory function is concerned, serving merely to follow up the body of useful gas which actually enters the lungs on each respiratory cycle. All of the body of gas which merely enters the respiratory passages leading to the lungs is, of course, exhaled and wasted, along with the useful body of tidal gas which actually enters the lungs.

In general, the volume of the above second body of gas, i. e. the tidal gas which actually enters and leaves the lungs each respiratory cycle, represents about two thirds of the total tidal gas which enters the mouth or nose each respiratory cycle. Accordingly one third of the tidal gas in each respiratory cycle, hereinafter referred to as unused gas, is not effectively used in the respiratory cycle because it does not enter the lungs.

It is the principal object of the present invention to provide a more economical use of the tidal gas inhaled and exhaled in breathing, this being accomplished by introducing a charge of the relatively effective gas at the start of each inhalation, which charge enters the lungs and is fully effective, and by thereafter introducing a charge of the relatively ineffective gas at the end of each inhalation, and which latter charge is the unused gas which merely fills the respiratory passages leading to the lungs as follow up gas for the first charge of gas. By the practice of the present invention savings in the order of from twenty to forty percent in the use of the relatively effective gas can be effected.

Another object is to provide such method and apparatus in which the separate charges of relatively effective and relatively ineffective gases are inhaled in response to the respiratory demand of the user.

Another object is to provide such apparatus in which the relative amounts of the relatively effective and ineffective gases introduced into the lungs can be regulated thereby to vary the richness of the total gas introduced into the lungs.

Another object is to provide such apparatus in which moderately high pressure relatively effective gas is applied to the breathing regulating mechanism, this insuring that any leakage is to the exterior to avoid contamination of the gas; permitting the use of smaller and less bulky lines; and in particular permitting the employment of the line to such breathing regulating mechanism as a small volume demand storage chamber in which successive charges of the relatively effective gas are accumulated.

Another object is to provide such apparatus which can readily be converted for use as conventional breathing apparatus, that is, to supply only the relatively effective gas to the user, without follow up relatively ineffective gas, in response to the respiratory demand of the user.

Another aim is to provide such apparatus which incorporates simple valve mechanisms which are of such sensitivity to be readily responsive to the normal inhalation and exhalation effort of the user and at the same time are of rugged and durable construction and will operate efficiently for a longer period of time under conditions of severe and constant use.

Another object is to provide a form of such apparatus in which oxygen is employed as the relatively effective gas and in which air drawn directly from the atmosphere is employed as the relatively ineffective gas.

Another object is to provide a form of such apparatus in which oxygen is employed as the relatively effective gas and in which the exhalation products of the user are employed as the relatively ineffective gas.

Other objects and advantages of the invention will be apparent from the following description and drawings in which:

Fig. 1 is a fragmentary side elevational view of apparatus embodying the present invention and shown as particularly designed for supplying oxygen as the relatively effective gas and ambient air as the relatively ineffective gas.

Fig. 2 is an enlarged fragmentary side elevational view, taken generally on line 2—2, Fig. 1, and showing parts broken away to disclose the mechanism.

Fig. 3 is a fragmentary section taken generally on line 3—3, Fig. 2.

Fig. 6 is a view similar to Fig. 1 and showing a modified form of the invention in which oxygen is used as the relatively effective gas and in which the products of exhalation of the user are used as the relatively ineffective gas.

Fig. 7 is an enlarged fragmentary side elevational view taken generally on line 7—7, Fig. 6.

Fig. 8 is a fragmentary section taken generally on line 8—8, Fig. 7.

Figure 4:
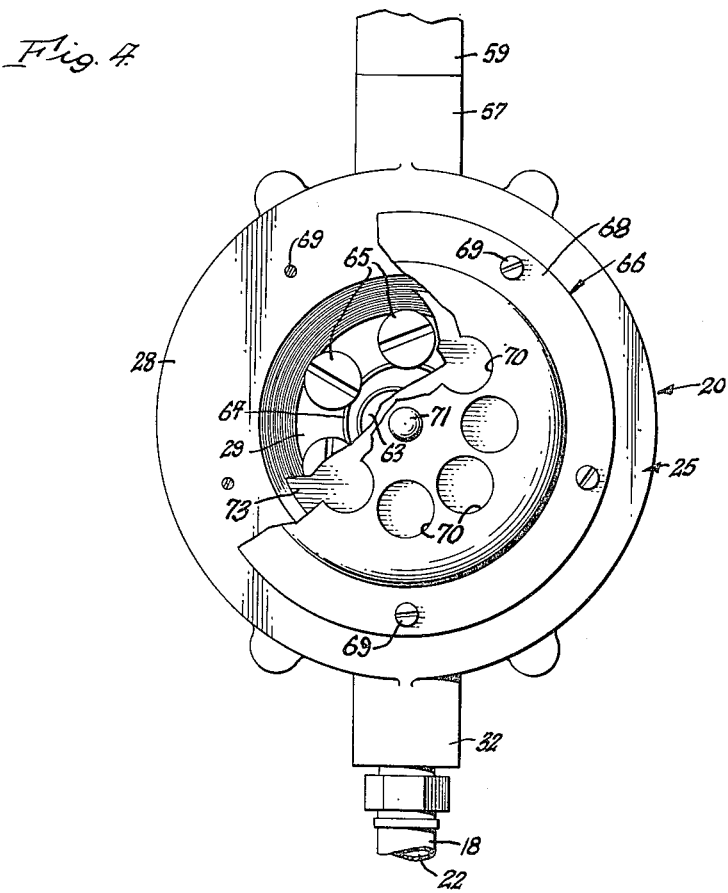
Fig. 4 is an enlarged fragmentary side elevational view, with parts broken away, and taken generally on line 4—4, Fig. 1.

As indicated, the essential distinction between the form of the invention shown in Figs. 1–5 as compared with the form of the invention shown in Figs. 6–8 is that in the former air is used as the relatively ineffective gas whereas in the latter the products of exhalation are used as the relatively ineffective gas, both forms of the invention showing the use of oxygen as the relatively effective gas. It will be understood, of course, that the invention is not necessarily limited to these gases but can be practiced wherever it is desirable to introduce a gas into the lungs without substantial waste of this gas by merely being drawn into the respiratory passages leading to the lungs.

In the form of the invention shown in Figs. 1–5, the numeral 10 represents an oxygen storage cylinder containing substantially pure oxygen at, say, 2,000 pounds per square inch. To the outlet neck of this oxygen cylinder is screwed a regulator or reducing valve 11 shown as having a gage 12 which indicates the pressure within the oxygen storage tank 10 and also shown as having a gage 13 indicating the pressure on the outlet side of the regulator or pressure reducing valve 11 and which pressure can be any value up to 100 pounds per square inch, say, 3 atmospheres. If desired this gage 13 can be calibrated in units of the concentration of oxygen supplied to the user inasmuch as this oxygen concentration is a function of the pressure on the outlet side of the regulator or reducing valve 11.

Figure 5:
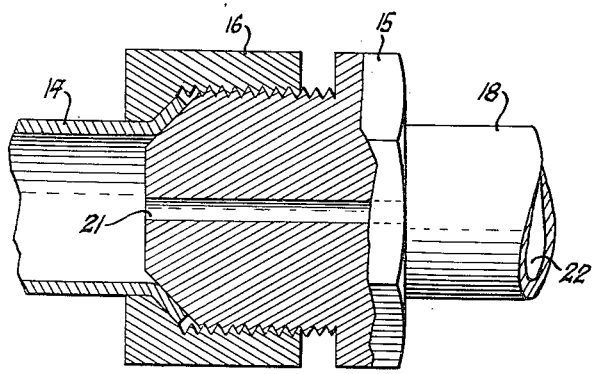
Fig. 5 is a greatly enlarged fragmentary sectional view taken generally on line 5—5, Fig. 1.

The outlet tube 14 from the regulator or pressure reducing valve 11 is shown as clamped against a screw fitting or nipple 15 by means of a threaded collar 16, as best shown in Fig. 5. The other side of the fitting or nipple 15 is connected by a line 18 with a breathing regulating mechanism indicated generally at 20.

An important feature of the invention resides in the provision of a restricted orifice 21 through the fitting or nipple 15 and which orifice provides a medium demand pressure storage chamber 22 in the line 18 connecting the fitting 15 with the breathing regulating mechanism 20.

A feature of the invention is its ready adaptability for use as a normal demand regulated breathing apparatus for supplying only the more effective gas, in this case oxygen, to the user. This is accomplished by bypassing the orifice 21, and for this purpose a bypass line 23 is provided around this orifice and contains an off-on valve 24.

The breathing regulating mechanism 20 is shown as including a generally circular metal shell 25 having a circular rim 26 and, across one side, a wall 28 the central part 29 of which is offset into the interior of the shell 25 so as to form a relatively small ambient air chamber 30 on one side of this wall and a relatively large demand chamber 31 on the opposite side of this wall. At one side the shell 25 is provided with an integral inlet neck 32 which is shown as projecting radially from the rim 26 and as connected with the end of the line 18 and hence in communication with the medium pressure demand storage chamber 22 formed by this line 18.

The bore 33 through the neck 32 communicates with the stem of a pressure gage flow indicator 34. Such a flow indicator preferably includes a vane which is moved in response to variations in pressure and since the pressure in the medium pressure demand storage chamber 22 varies substantially from zero to full medium pressure on each inhalation this gage or flow indicator 34 can be of rugged construction, its primary purpose being to show to others that the user is breathing normally and that the apparatus is functioning properly with oxygen being supplied from the storage tank 10.

The bore 33 in the inlet neck 32 is provided with an angular portion 35 which opens toward the demand chamber 31 and has its axis directed toward the center of a circular metal plate 36 secured to the inner face of a diaphragm 38. The rim of this diaphragm embraces the rim 26 of the shell 25, this diaphragm thereby forming one wall of the demand chamber 31 and enclosing this chamber. The rim of the diaphragm 38 is secured to the rim 26 of the shell 25 by a cover 39 having a rim 40 which embraces the rim of the diaphragm 38. A chamber 41 is thereby formed between the diaphragm 38 and the cover 39 and an ambient pressure is maintained in this chamber 41 by the provision of vent openings 42. If it is desired to maintain a slightly higher than ambient pressure in the demand chamber 31 so that any leakage will be to the exterior of the apparatus, a light compression spring (not shown) can be interposed between this diaphragm and the cover 39 as illustrated in detail in my copending patent application for Control Device for Breathing Apparatus, Serial No. 313,867, filed October 9, 1952 and now Patent No. 2,728,340, granted December 27, 1955.

The angular portion 35 of the bore 33 in the inlet neck 32 carries a demand valve 45 and is shown as being enlarged to provide an annular shoulder 46 opposing the demand chamber 31. A metal valve seat disk 48 is press fitted in the angular portion 35 of the bore 33 against the annular shoulder 46, a soft washer 49 being shown as interposed between the valve seat disk 48 and the annular shoulder 46. This valve seat disk has a central opening 50 which is preferably of conical form enlarging and with its axis directed toward the center of the metal plate 36 and diaphragm 38. The valve head 51 of the demand valve 45 is shown as being in the form of a cup with an axially extending rim 52 seated on the face of the valve seat disk 48 remote from the demand chamber 31. In this valve head is anchored one end of a valve stem or rod 53 which projects through the opening 50 of the valve seat disk and has a rounded end 54 arranged in close proximity to the center of the metal disk 36 mounted on the diaphragm 38.

The demand valve 45 is also shown as having a return spring 55. This spring biases the valve head 51 toward the closed position. This spring is shown as being in the form of a spiral compression spring with its large end bearing against the valve seat disk 48 and with its small end bearing against a small collar 56 press fitted on the rod 53.

The shell 25 is shown as provided with an outlet neck 57 which is shown as projecting radially from the rim 26 opposite from the inlet neck 32. This outlet neck 57 provides communication between the demand chamber 31 and the mask 58 of the wearer, the connection between the outlet neck 57 and the mask 58 being shown as being in the form of a flexible tube 59. The mask 58 is shown as provided with a conventional outwardly opening exhaust check valve 60 through which the user exhales on each exhalation.

The inwardly offset portion 29 of the wall 28 of the metal shell 25 is provided at its center with a large opening 61, this opening being surrounded by an annular bead 62 projecting away from the demand chamber 31. On this bead 62 is fitted a thin metal valve disk 63 which is biased into its closed position against the bead 62 by a spiral compression spring 64. The outer convolution of this spring is held by the heads of a plurality of mounting screws 65 so that the spring 64 is in compressive relation with the valve disk 63 and which valve disk thereby serves as a valve between the chambers 31 and 30 and opening toward the chamber 30.

The chamber 30 is enclosed by a sheet metal cap or cover 66 the rim 68 of which is secured against the outer face of the rear wall 28 of the shell 25 by an annular series of screws 69. This sheet metal shell or cover 66 is also provided with an annular series of openings 70 which are in concentric relation with a central rivet 71 extending through the sheet metal cover or shell 66. This rivet, through a washer 72, secures a highly flexible check valve disk 73 to the inner face of the sheet metal cover or cap 66. This check valve disk 73 is of sufficient flexibility so that on a reduction of pressure in the chamber 30 it is drawn away from the sheet metal cap or cover 66 and permits air to flow through the openings 70 into this chamber 30.

An important feature of the invention resides in the provision of an air inlet interlock between the diaphragm 38 and the valve disk 63 and which operates to open this valve disk 63 following a predetermined movement of the diaphragm 38. For this purpose a boss 74 is provided in the interior of the shell 25 near the rim thereof and to this boss is secured, as by screws 75, a metal spring leaf 76. This spring leaf projects radially toward the center of the demand chamber 31 and at its free end carries a stem or pin 78 which is preferably arranged coaxial with the metal plate 36 on the diaphragm 38 and also the valve disk 63. This stem 78 has a rounded end 79 which engages the valve disk 63 and also has a rounded end 80 which is engaged by the metal disk 36 of the diaphragm 38.

In the following description of the operation of the form of the invention shown in Figs. 1–5, it will be assumed that the mask 58 is applied to the face of the user, that the storage cylinder 10 contains oxygen under a pressure of 2,000 p. s. i. as indicated on the gage 12, that the outlet pressure of the regulator or pressure reducing valve 11 is three atmospheres as indicated on the gage 13, which can also be calibrated in units of oxygen concentration as received by the user, and that the bypass valve 24 is closed so that this pressure of three atmospheres is applied to the orifice 21 and so that oxygen at this pressure builds up in the medium pressure demand storage chamber 22 at a rate corresponding to the size of the orifice 21.

As previously indicated, with each respiratory cycle, about two thirds of the total volume of gas inhaled enters the lungs as useful gas while the remaining third merely enters the respiratory passages leading to the lungs and hence is useless gas except for its function of following up the body of useful gas which actually enters the lungs. The total volume of this useful and unused gas inhaled and exhaled during each respiratory cycle varies between 15 and 40 cubic inches. It can also be assumed that the medium pressure demand storage chamber 22 in the pipe or line 18 between the orifice 21 and the breathing mechanism 20 has a capacity of 3 cubic inches.

When the user, wearing the mask 58, inhales, through the flexible conduit 59 and outlet neck 57, a negative pressure is established in the demand chamber 31. Accordingly the diaphragm 38 is moved to the right as viewed in Fig. 3 to contact and move the free end 54 of the valve stem or rod 53 laterally to the right. This tips the cup-shaped valve head 51 laterally and hence separates one side of its bead 52 from the high pressure side of the valve seat disk 48 and permits the charge of medium pressure gas in the medium pressure demand storage chamber 22 to escape through the valve opening 50 into the demand chamber 31.

Since the 3 cubic inches of oxygen in the medium pressure demand storage chamber 22 is under 3 atmospheres of pressure, a charge of approximately 9 cubic inches of oxygen at atmospheric pressure flows through the valve opening 50 and demand chamber 31, and is drawn into the lungs of the user. This charge of oxygen is rendered available only during the first part of the inhalation, for filling the lugs of the user. Thus the restricted orifice 21 retards the refilling of the medium pressure demand storage chamber 22 to a degree which prevents refilling of this medium pressure demand storage chamber at a rate equal to the rate of exhaustion of this medium pressure demand storage chamber during inhalation by the user.

The assumed 9 cubic inches of oxygen is not, however, enough to satisfy the 15 to 40 cubic inch inhalation requirement of the user. Accordingly when this initial charge of oxygen is used up, the continued inhalation by the user reduces the pressure in the demand chamber 31 still further and causes the diaphragm 38 to move further to the right, as viewed in Fig. 3, and causes its metal disk 36 to contact and move the pin 78 to the right. This pin, in turn, engages and moves the valve disk 63 of the air inlet valve to the right against the resistance of its light spiral compression spring 64. This establishes communication between the demand chamber 31 and the air chamber 30 and accordingly a negative pressure is established in this air chamber. This negative pressure draws the flexible check valve disk 73 away from the inner face of the sheet metal cap or cover 66 and hence atmospheric air enters through the ports 70 into the air chamber 30. This air is drawn, in response to completion of the inhalation effort of the user, through the now open air inlet valve disk 63, and through the demand chamber 31, outlet neck 57, flexible conduit 59 and mask 58 into the mouth or nose of the user. This charge of air, of course, follows the body of oxygen existing in the demand chamber 31, flexible conduit 59, mask 58, and respiratory passages leading to the lungs of the user. Accordingly this body of oxygen is drawn into the lungs of the user and is followed by the charge of air which fills the demand chamber 31, flexible conduit 59 and mask 58 as well as the respiratory passages leading to the lungs of the user with a relatively ineffective gas, namely air. The user completes the inhalation with air rather than with the relatively effective gas or oxygen.

When the user exhales, a positive pressure is established in the mask 58 and this positive pressure opens the exhaust check valve 60 so that the user's products of exhalation are exhausted directly to the atmosphere.

Under the conditions above assumed, that is, with the regulator or pressure reducing valve 11 supplying, through the restricted orifice 21, oxygen at a pressure of 3 atmospheres to the 3 cubic inch medium pressure demand storage chamber 22, as noted, the oxygen released from this chamber 22 into the demand chamber 31 immediately becomes approximately 9 cubic inches. Assuming a total tidal volume of gas entering the body of the user to be 40 cubic inches, the 9 cubic inches of oxygen would be followed by 31 cubic inches of air. With approximately two thirds of the total tidal volume of 40 cubic inches, or from 25 to 27 cubic inches of gas, actually entering the lungs of the user, the composition of this gas actually entering the lungs would be about one half oxygen. This oxygen content is made up by the nine cubic inches of oxygen supplied from the oxygen storage tank 10 plus a minimum of 3 cubic inches of oxygen supplied by that portion of the follow up air actually entering the lungs. Accordingly the lungs are supplied with a partial pressure of oxygen of approximately 50% concentration and which is a very high concentration.

The modified form of the invention shown in Figs. 6–8 is essentially distinguished from the form of the invention shown in Figs. 1–5 by the use of the products of exhalation of the wearer of the mask as the relatively ineffective gas in place of air as with the form of the invention shown in Figs. 1–5.

The breathing regulating mechanism illustrated in Figs. 6–8 is served by the same oxygen storage cylinder 10, pressure regulator or reducing valve 11, restricted orifice 21 forming a medium pressure demand storage chamber 22 in the line 18 and the valved bypass 23, 24, and hence the description of this part of the apparatus is not repeated. It will be noted, however, that the mask 58a with the form of the invention shown in Figs. 6–8 is unprovided with the exhaust check valve 60 shown in Fig. 1.

As with the form of the invention shown in Figs. 1–5, the breathing regulating mechanism 90 of the form of the invention shown in Figs. 6–8 includes a shell 91 having a circular rim 92 and one side of which is closed by a wall 93 having an axially offset central portion 94 and also having an inlet neck 95 projecting radially from the rim and which neck is suitably connected to the line or pipe 18 forming the medium pressure demand storage chamber 22. The offset portion 94 of the wall 93 is offset into a demand chamber 96 and separates this demand chamber from an exhaled gas storage chamber 98 of sufficient size to store the required quantity of gas exhaled by the user for reuse on the next inhalation. This exhaled gas storage chamber 98 is provided by an annular shell or rim 99 having a rim 100 which is secured against the exterior face of the rear wall 93 of the shell 91 in any suitable manner with the sealing gasket 101 interposed therebetween.

The side of the shell 99 opposite this sealing gasket 101 is open, as indicated at 102, and this open side is formed to provide a neck 103 against which is fitted the rim of an expansible diaphragm 104. This rim of this diaphragm is held in sealed engagement with the rim 103 of the shell 99 by the rim 105 of a cover or cap 106 which cover or cap can be secured in any suitable manner. This cover or cap 106 is provided with a series of vent holes 108 so that the chamber 109 between this cover or cap 106 and the diaphragm 104 is under ambient pressure.

As with the form of the invention shown in Figs. 1–5 the bore 110 in the inlet neck 95 communicates with the neck of a flow indicator 111 which is identical with the flow indicator 34 of the form of the invention shown in Figs. 1–5. This bore 110 is provided at its end adjacent the demand chamber 96 with an angular portion 112 the axis of which is directed toward the center of a circular plate 113 secured to the inner face of a diaphragm 114, the rim of which diaphragm embraces the rim 92 of the shell 91 so as to form one wall of the demand chamber 96. The diaphragm 114 is enclosed and protected by a cap or cover 115 having a rim 116 which embraces the rim of the diaphragm 114 and secures it in engagement with the rim 92 of the shell 91. This cap or cover 115 is provided with a series of vent openings 118 which maintains the chamber 119 between the diaphragm 114 and the cap or cover 115 at ambient pressure.

As with the form of the invention shown in Figs. 1–5, the flow of oxygen into the demand chamber 96 is under control of a demand valve indicated generally at 120. To mount this demand valve 120 the angular portion 112 of the bore 110 is provided at its end adjacent the demand chamber 96 with an enlarged portion forming an annular seat or recess 121 for a metal valve seat disk 122 which is press fitted in position against a soft sealing washer 123. This valve seat disk 122 has a central opening 124 which is preferably of conical form enlarging and with its axis directed toward the center of the metal plate 113 and diaphragm 114. The valve head 125 of the demand valve 120 is shown as being in the form of a cup with an axially extending bead or rim 126 fitting against the face of the valve seat disk 122 remote from the demand chamber 96. In this valve head is anchored one end of a valve stem or rod 128 which projects through the opening 124 of the valve seat disk 122 and has a rounded end 129 arranged in close proximity to the center of the metal disk 113 mounted on the diaphragm 114.

The demand valve 120 is also shown as having a return spring 130. This spring biases the valve head 125 toward its closed position. This spring is shown as being in the form of a spiral compression spring with its large end bearing against the valve seat disk 122 and with its small end bearing against a small collar 131 press fitted on the rod 128.

The shell 91 is shown as provided with an outlet neck 132 projecting in the opposite direction from the inlet neck 95 and which provides communication between the demand chamber 96 and the flexible hose 60 leading to the face mask 58a.

The inwardly offset portion 94 of the wall 93 of the metal shell 91 is provided at its center with a large opening 133, this opening being surrounded by an annular bead 134 projecting away from the demand chamber 96. On this bead 134 is fitted a thin metal valve disk 135 which is biased into its closed position against the bead 134 by a spiral compression spring 136. The outer largest convolution of this spring is held by the heads of a plurality of mounting screws 138 so that the spring 136 is in compressive relation with the valve disk 135 and which thereby serves as a valve between the chambers 96 and 98 and opens toward the chamber 98.

As with the form of the invention shown in Figs. 1–5 an important feature of the modified form of the invention resides in the provision of an interlock between the diaphragm 114 and the valve disk 135 and which operates to open this valve disk 135 following a predetermined movement of the diaphragm 114. For this purpose a boss 140 is provided in the interior of the shell 91 near the rim thereof and to this boss is secured, as by screws 141, a metal spring leaf 142. This spring leaf projects radially toward the center of the demand chamber 96 and at its free end carries a stem 143 which is arranged coaxial with the metal plate 113 on the diaphragm 114 and also the valve disk 135. This stem 143 has a rounded end 144 which engages the valve disk 135 and also has a rounded end 145 which is engaged by the metal disk 113 of the diaphragm 114.

A check valve, indicated generally at 150, is interposed between the demand chamber 96 and the exhaled gas storage chamber 98 and opens toward this exhaled gas storage chamber 98. For this purpose the wall 93 of the shell 91 is provided with an opening 151 which is surrounded by a bead 152 projecting toward the exhaled gas storage chamber 98. A circular rim 153 surrounds this opening 151 and also projects toward the exhaled gas storage chamber 98 and is provided with an inwardly projecting annular flange 154. Against this flange 154 is compressed the large convolution of a spiral compression spring 155 the small convolution of which compressively engages the face of a thin metal check valve disk 156. With a preponderated pressure in the demand chamber 96 as compared with the exhaled gas storage chamber 98 the check valve disk 156 opens to permit flow into the exhaled gas storage chamber 98.

A part of the gas so flowing into the exhaled gas storage chamber 98 escapes through an exhaust check valve, indicated generally at 160. This exhaust check valve is shown as comprising an opening 161 through the rim 100 of the shell 99 and which opening is surrounded by a bead 162 projecting toward the exterior. This opening 161 is also surrounded by a cylindrical rim 163 which projects toward the exterior of the breathing regulating mechanism and is internally threaded at its outer end. In these threads is screwed a plug 164 having a plurality of exhaust openings 165. The largest convolution of a spiral compression spring 166 bears against the inner face of this plug and the opposite smallest convolution of this spring bears against a thin metal valve disk 168 and compressively holds this valve seat disk against the bead 162.

In the operation of the form of the invention shown in Figs. 6–8, it will again be assumed that the mask 58a is applied to the face of the user, that the storage cylinder 10 contains oxygen under a pressure of, say, 2,000 p. s. i.'s as indicated on the gage 12, that the outlet pressure of the regulator or pressure reducing valve 11 is at an intermediate pressure substantially above atmospheric pressure as indicated on the gage 13 and that the bypass valve 24 is closed so that this medium pressure is applied to the orifice 21 and so that oxygen at this pressure builds up at the medium pressure demand storage chamber 22 at a rate corresponding to the size of the orifice 21. It will also be assumed that the medium pressure storage chamber 22 in the pipe line 18 between the orifice 21 and the breathing regulating mechanism 90 has a capacity of three cubic inches.

It will also be assumed that the exhaled gas storage chamber 98 is filled with the exhalation products of the user and that the expansible chamber diaphragm 104 has been fully distended against the cap or cover 106 by the user during the preceding exhalation.

When the user, wearing the mask 58a, inhales, through the flexible conduit 59 and the outlet neck 132, a negative pressure is established in the demand chamber 96. Accordingly the diaphragm 114 is moved to the right as viewed in Fig. 8 to contact and move the free end 129 of the valve stem or rod 128 laterally to the right. This tips the cup shaped valve head 125 laterally and hence separates one side of its bead 126 from the high pressure side of the valve seat disk 122 and permits the charge of medium pressure gas in the medium pressure demand storage chamber 22 to escape through the valve opening 124 into the demand chamber 96.

As with the form of the invention shown in Figs. 1–5, since the volume of oxygen in the medium pressure demand storage chamber 22 is under a pressure intermediate atmospheric and the very high pressure in the oxygen storage cylinder 10, a charge of oxygen at medium pressure flows through the valve opening 124 and into the demand chamber 96 and is drawn into the lungs of the user. This charge of oxygen is rendered available only during the first part of the inhalation for filling the lungs of the user. Thus the restricted orifice 21 retards the refilling of the medium pressure demand storage chamber 22 to a degree which prevents refilling of this medium pressure demand storage chamber at a rate equal to the rate of exhaust of this medium pressure demand storage chamber during inhalation by the user.

The charge of oxygen in the demand storage chamber 22 is not, however, enough to satisfy the inhalation requirement of the user. Accordingly when this initial charge of oxygen is used up, the continued inhalation by the user reduces the pressure in the demand chamber 96 still further and causes the diaphragm 114 to move further to the right, as viewed in Fig. 8, and causes its metal disk 113 to contact and move the pin 143 to the right. This pin, in turn, engages and moves the valve disk 135 to the right against the resistance of its light spiral compression spring 136. This establishes communication between the demand chamber 96 and the exhaled gas storage chamber 98. Accordingly the products of exhalation stored in this exhaled gas storage chamber 98 are drawn past the open valve disk 135 into the demand chamber 96 and thence through the outlet neck 132, flexible conduit 59 and mask 58a into the mouth or nose of the user.

This charge of rebreathable exhaled or exhaust gas, of course, follows the body of oxygen existing in the demand chamber 96, flexible conduit 59, mask 58a, and respiratory passages leading to the lungs of the user. Accordingly this body of oxygen is drawn into the lungs of the user and is followed by the charge of rebreathable exhaled gas which fills the demand chamber 96, flexible conduit 59 and mask 58a as well as the greater part of the respiratory passages leading to the lungs of the user with a relatively ineffective gas, namely, the rebreathable exhaled or exhaust gas stored in the exhaled gas storage chamber 98. Thus the user completes his inhalation with rebreathable exhaled gas rather than with the relatively effective gas or oxygen.

When the user exhales a positive pressure is built up in his mask 58a, flexible tube 59, and demand chamber 96. This positive pressure immediately drives the diaphragm 114 to the left, as viewed in Fig. 8 and against the cap or cover 115. This movement releases the pin 143 and the spring leaf 142 moves this pin out of contact with the valve disk 135. Accordingly this valve disk is seated on its bead 134 by its backing spring 136.

This movement of the diaphragm 114 also releases the end 129 of the stem 128 of the demand valve 120. Accordingly the return spring 130 moves the valve stem or rod 128 from the tipped position, in which it was held by the diaphragm 104, to a position normal to the valve seat disk 122. In this normal poistion of the valve stem or rod 128 the bead 126 of the valve head 125 is seated against the valve disk 122 its entire extent and accordingly the demand valve 120 is closed.

With the closing of this demand valve 120 pressure commences to build up in the medium pressure demand storage chamber 22. This build up of pressure is at the rate permitted by the size of the orifice 21 and which is designed so that the medium pressure demand storage chamber 22 is filled with oxygen at the desired medium pressure by the time the exhalation of the user has been completed. This charge of oxygen is, of course, supplied from the storage cylinder 10 under the assumed pressure of 2,000 p. s .i.'s through the regulator or pressure reducing valve 11 which is set to reduce the oxygen pressure to the desired and predetermined medium pressure.

As the positive pressure in the demand chamber 96 continues to build up in response to the exhalation of the user, this pressure opens the check valve 156 thereby permitting the products of exhalation to flow into the exhaled gas storage chamber 98. This pressure expands the expandable chamber diaphragm 104 into contact with the cap or cover 106. After this expansion of this expansible chamber diaphragm 104 has been completed, further rise of pressure in the exhaled gas storage chamber 98 opens the exhaust check valve disk 168 against the resistance of its return spring 166. Accordingly the excess products of exhalation of the user flow from the exhaled gas storage chamber through the apertures 165 of the plug 164 to the atmosphere.

At the start of the next respiratory cycle by the next inhalation of the user the conditions are restored to those assumed at the start of this description of the operation of the form of the invention shown in Figs. 6–8 and accordingly successive respiratory cycles are effected in this same manner.

Assuming that it is desired to supply the user of the mask with pure oxygen, as for some emergency service, all that is necessary to do is to open the bypass valve 24. This, of course, cuts out the function of the restricted orifice 21 and converts the medium pressure demand storage chamber 22 into an ordinary conduit. Accordingly when the user inhales he reduces the pressure in the demand storage chamber 96 so as to move the diaphragm 114 to the right as viewed in Fig. 8. This moves the free end 129 of the valve stem or rod 128 to the tipped position with reference to the valve seat disk 122 so as to tilt the valve head 125 with reference to the valve seat disk 122 and permit the oxygen from the interior 22 of the line 18 to flow through the valve opening 124 into the demand chamber 96 and thence through the outlet neck 132, flexible conduit 59 and neck 58a into the nose or mouth of the user. Since, with the bypass valve 24 open, oxygen at the predetermined medium pressure is being supplied from the storage cylinder 10 as rapidly as the rate of withdrawal which is determined only by the degree of opening of the demand valve 120. Since oxygen is continuously supplied to the demand chamber at an adequate rate, the diaphragm 114 in the demand chamber 96 is not moved far enough to the right, as viewed in Fig. 8, to contact the pin 143. Accordingly all that the user inhales is pure oxygen.

When the user exhales a positive pressure is built up in the demand chamber 96 so as to drive the diaphragm 114 to the left against the cap or cover 115. This releases the free end 129 of the stem 128 of the demand valve 120 and its return spring 130 restores the valve stem 128 to a position normal to the valve seat disk 122. In this position the valve head 125 is fully closed and hence further admission of oxygen from the inlet neck 95 to the demand chamber 96 is cut off.

As the user continues to exhale and build up a further positive pressure in the demand chamber 96, this pressure opens the disk 156 of the spring loaded check valve 150 and hence the exhaled gas flows in to the exhaled gas storage chamber 98. The pressure in this exhaled gas storage chamber 98 accordingly rises to a value which opens the spring loaded disk 168 of the exhaust valve 160 and hence the balance of the products of exhalation by the user escape through the ports 165 of the plug 164 to the atmosphere.

With the reuse of the products of expiration in the form of the invention shown in Figs. 6–8, the reuse of the expired gas is limited by the concentration of the $CO_2$ in the expired gas. It has been found that reuse of expired gas of less than 2% $CO_2$ is acceptable and not detrimental to the user. Since the products of expiration of a person contains approximately 5 to 6% $CO_2$, it is possible to allow one fourth of the volume required to enter the lung (⅔ of the assumed 40 cubic inches, or about 27 cubic inches) to be the gas previously expired and still permit the partial pressure in the lungs to remain at its proper low value by having the partial pressure of $CO_2$ in the overall gas actually entering the lungs less than 2%. Since the lungs having a capacity of about 27 cubic inches can be supplied with not more than a quarter of this capacity, or about 9 cubic inches, with reused exhaled gas, it is apparent that more than 9 cubic inches of oxygen assumed in the operation of the form of the invention shown in Figs. 1–5 must be supplied with the form of the invention shown in Figs. 6–8. This additional oxygen is also required because, of course, the products of exhalation are depleted in oxygen as compared with air. Such increased volume of oxygen can readily be supplied by adjusting the regulator or pressure reducing valve to have a higher outlet pressure, or by increasing the length of the line or pipe 18 to provide a medium pressure storage chamber 22 of greater volume.

From the foregoing it will be seen that the present invention provides a new method and apparatus for supplying relatively effective and relatively ineffective gases for breathing in which the required amounts of each are supplied in response to the respiratory demand of the user on each respiratory cycle and that the practice of the invention effects a large saving in the use of the relatively effective gas. It will further be seen that the apparatus is rugged and dependable and readily adjustable to supply any desired concentration or amount of the relatively effective gas including 100% thereof.

I claim:

1. Apparatus for separately supplying relatively effective and relatively ineffective gases for respiration, which comprises means forming a demand chamber adapted to be placed in communication with the respiratory passages leading to the lungs of the user, means forming a demand storage chamber adjacent said demand chamber, said demand storage chamber being of insufficient volume to satisfy an inhalation requirement of the user, means arranged to refill said demand storage chamber with said relatively effective gas under higher than atmospheric pressure, means adjacent said demand chamber and arranged to supply said relatively ineffective gas, valve means between said demand chamber and both said demand storage chamber and said supply of relatively ineffective gas, and means responsive to the inspiration demand of the user and arranged to actuate said valve means to establish communication between said demand chamber and said demand storage chamber and thereafter to actuate said valve means to establish communication between said demand chamber and said supply of relatively ineffective gas.

2. Apparatus for separately supplying relatively effective and relatively ineffective gases for respiration, which comprises means forming a demand chamber adapted to be placed in communication with the respiratory passages leading to the lungs of the user, means forming a demand storage chamber adjacent said demand chamber, said demand storage chamber being of insufficient volume to satisfy an inhalation requirement of the user, means arranged to refill said demand storage chamber with said relatively effective gas under higher than atmospheric pressure, means adjacent said demand chamber and arranged to supply said relatively ineffective gas, valve means between said demand chamber and both said demand storage chamber and said supply of relatively ineffective gas, and means responsive to an initial degree of reduction in pressure in said demand chamber to actuate said valve means to establish communication between said demand chamber and said demand storage chamber and at a greater reduction in pressure in said demand chamber to actuate said valve means to establish communication between said demand chamber and said supply of relatively ineffective gas.

3. Apparatus as set forth in claim 2 wherein said relatively effective gas is supplied to said demand storage chamber at a pressure substantially higher than atmospheric pressure and at a rate substantially less than the rate of flow of said relatively effective gas from said demand storage chamber to said demand chamber.

4. Apparatus as set forth in claim 2 including a supply conduit for supplying said relatively effective gas to said demand storage chamber, the opening between said supply conduit and demand storage chamber including a restricted orifice, said restricted orifice being of such size as to supply said relatively effective gas to said demand storage chamber at a rate substantially less than the rate of flow of said relatively effective gas from said demand storage chamber to said demand chamber.

5. Apparatus as set forth in claim 4, including a valved bypass around said restricted orifice.

6. Apparatus for separately supplying relatively effective and relatively ineffective gases for respiration, which comprises a shell forming a demand chamber adapted to be placed in communication with the respiratory passages leading to the lungs of the user, a conduit forming a demand storage chamber communicating through a first opening with said demand chamber, said demand storage chamber being of insufficient volume to satisfy an inhalation requirement of the user, a first valve across said first opening and adapted to open and close the same, means arranged to refill said demand storage chamber with said relatively effective gas, said shell having a second opening leading to a supply of relatively ineffective gas, a second valve across said second opening and adapted to open and close the same, and means responsive to reduction in pressure in said demand chamber and arranged in said demand chamber and arranged to first open said first valve and thereafter open said second valve.

7. Apparatus as set forth in claim 6 wherein said last means comprises a diaphragm forming one wall of said demand chamber and moved in response to variations in pressure in said demand chamber, and means operatively connecting said diaphragm with each of said valves.

8. Apparatus as set forth in claim 6 wherein said last means comprises a diaphragm forming one wall of said demand chamber and moved in response to variations in pressure in said demand chamber, means operatively connecting said diaphragm with said first valve, a motion transmitting member in said demand chamber in the path of movement of said diaphragm and arranged to actuate said second valve, and spring means supporting said motion transmitting member from said casing.

9. Apparatus as set forth in claim 8 wherein said spring means comprises a spring leaf secured at one end to said shell and at its other end to said motion transmitting member.

10. Apparatus for separately supplying relatively effective and relatively ineffective gases for respiration, which comprises a shell forming a demand chamber adapted to be placed in communication with the respiratory passages leading to the lungs of the user, a diaphragm forming one wall of said demand chamber and moved in response to variations in pressure in said demand chamber, a conduit forming a medium pressure demand storage chamber communicating through a first opening with said demand chamber, said first opening being arranged adjacent the margin of said diaphragm, a valve seat disk provided with an aperture mounted in said opening, a valve head seating against the face of said valve seat disk remote from said demand chamber around said aperture and tiltable to permit flow through said aperture, a stem fast to said valve head and projecting through said aperture toward the center of said diaphragm and in the path of movement of said diaphragm responsive to initial inspiration demand of the user, means arranged to refill said demand storage chamber with said relatively effective gas under higher than atmospheric pressure, said shell having a second opening leading to a supply of relatively ineffective gas and arranged opposite the face of said diaphragm, a valve disk yieldingly seated against the face of said shell remote from said demand chamber around said second opening, a spring leaf in said demand chamber and anchored at one end on said shell with its other free end interposed between said diaphragm and valve disk, and a motion transfer member fast to said other end of said spring leaf and arranged to be moved by said diaphragm to open said valve disk following tilting of said valve stem and valve head.

11. Apparatus for separately supplying oxygen and air for respiration, which comprises a shell forming a demand chamber adapted to be placed in communication with the respiratory passages leading to the lungs of the user, a conduit forming a demand storage chamber communicating through a first opening with said demand chamber, a first valve across said first opening and adapted to open and close the same, means arranged to refill said demand storage chamber with oxygen under higher than atmospheric pressure, a cover secured to the exterior of said shell and providing an air chamber, said shell being provided with a second opening providing communication between said demand chamber and air chamber, a second valve across said second opening and adapted to open and close the same, means responsive to reduction in pressure in said demand chamber and arranged to first open said first valve and thereafter open said second valve, and a check valve in said cover and opening toward the interior thereof to admit ambient air into said air chamber in response to a reduction of pressure in said air chamber.

12. Apparatus for separately supplying oxygen and previously exhaled gas for respiration, which comprises a shell forming a demand chamber adapted to be placed in communication with the respiratory passages leading to the lungs of the user, a conduit forming a demand storage chamber communicating through a first opening with said demand chamber, a first valve across said first opening and adapted to open and close the same, means arranged to refill said demand storage chamber with oxygen under higher than atmospheric pressure, an expandable diaphragm secured at its rim to the exterior of said shell and providing an exhaled gas storage chamber, said shell being provided with a second opening providing communication between said demand chamber and said exhaled gas storage chamber, a second valve across said second opening and adapted to open and close the same, means responsive to reduction in pressure in said demand chamber and arranged to first open said first valve and thereafter open said second valve, a check valve in the wall of said shell between said demand chamber and exhaled gas storage chamber and opening toward said exhaled gas storage chamber in response to a preponderating pressure in said exhaled gas storage chamber, and an exhaust check valve in an opening leading from said exhaled gas storage chamber to the atmosphere and opening toward the atmosphere to permit the escape of exhaled gas from said exhaled gas storage chamber when the pressure therein rises above a predetermined value.

References Cited in the file of this patent

UNITED STATES PATENTS

| | | |
|---|---|---|
| 1,848,234 | Swope | Mar. 8, 1932 |
| 2,269,500 | Wildhack | Jan. 13, 1942 |
| 2,406,888 | Meidenbauer | Sept. 3, 1946 |

FOREIGN PATENTS

| | | |
|---|---|---|
| 500,789 | Great Britain | Feb. 15, 1939 |